United States Patent [19]

Binoche

[11] 4,278,205
[45] Jul. 14, 1981

[54] CONSTANT FLOW RATE FLUID SUPPLY DEVICE, PARTICULARLY FOR A SPRAY GUN

[75] Inventor: Michel Binoche, Stains, France

[73] Assignee: S K M, Societe Anonyme, Stains, France

[21] Appl. No.: 33,302

[22] Filed: Apr. 25, 1979

[30] Foreign Application Priority Data

Apr. 28, 1978 [FR] France .................. 78 12704
Mar. 16, 1979 [FR] France .................. 79 06694

[51] Int. Cl.³ .......................................... B05B 12/10
[52] U.S. Cl. ................................. 239/75; 417/214
[58] Field of Search ............. 417/426, 245, 213, 214, 417/429; 239/75, 570; 222/71, 55

[56] References Cited

U.S. PATENT DOCUMENTS 3,816,028  6/1974  Schouteeten et al. ............. 417/214
4,080,874  3/1978  Burkhard ...................... 417/429 X Primary Examiner—Robert B. Reeves
Assistant Examiner—Gene A. Church

[57] ABSTRACT

Device for supplying at a constant rate a fluid utilizing apparatus with at least one fluid of variable viscosity, comprising a fluid source delivering said variable viscosity fluid, a first fluid circuit connecting said fluid source to the fluid utilizing apparatus, a second fluid circuit in which flows a constant viscosity fluid, two volumetric pumps mechanically coupled so that their flow rates are in a fixed relationship, a first one of the two pumps being inserted in the first fluid circuit, whereas the second pump is inserted in the second fluid circuit, and adjusting means inserted in the second fluid circuit, downstream of the second pump, for adjusting the flow rate of the constant viscosity fluid. The supply device is particularly suitable for supplying a spray gun with paint.

21 Claims, 5 Drawing Figures

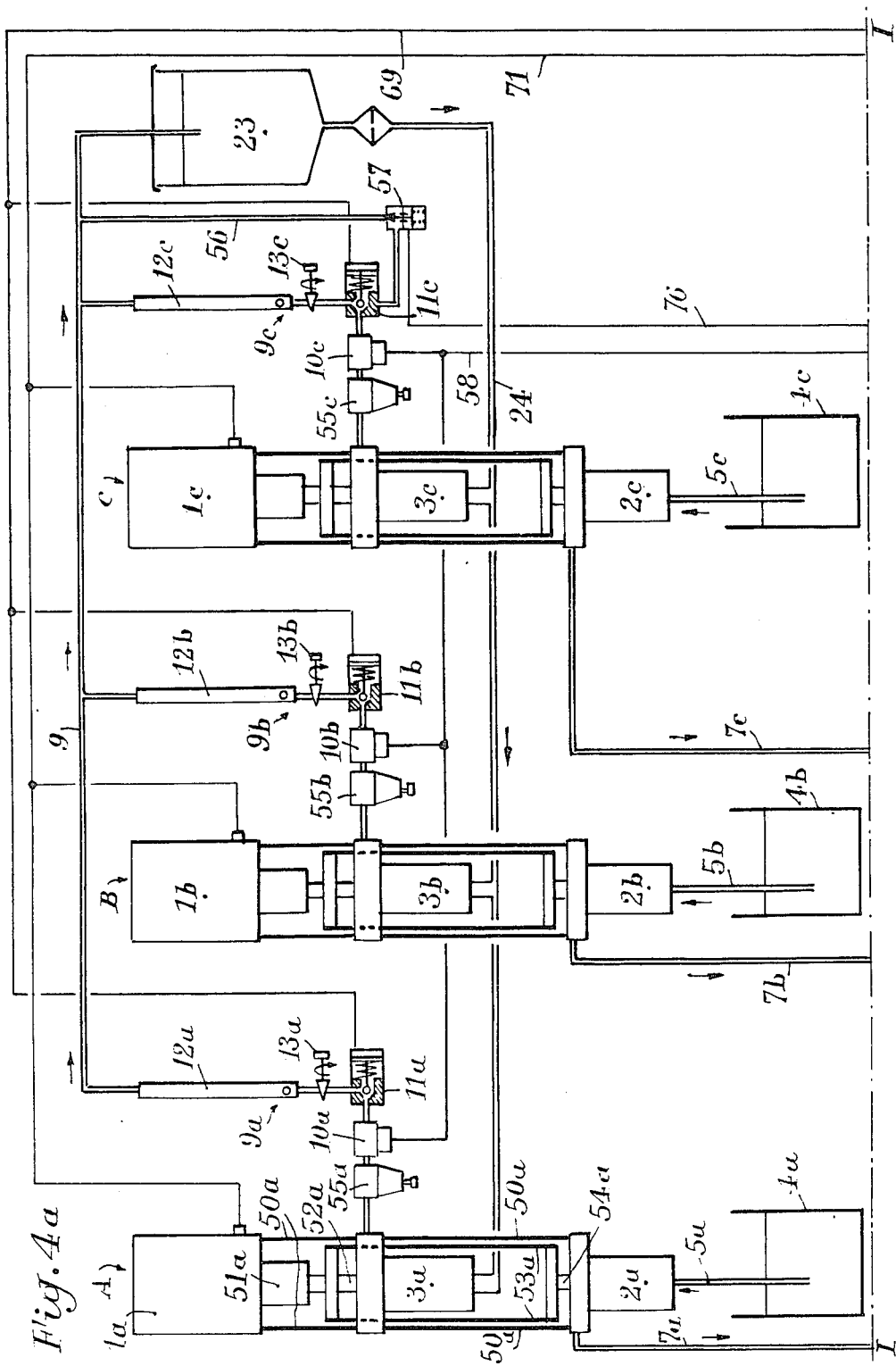

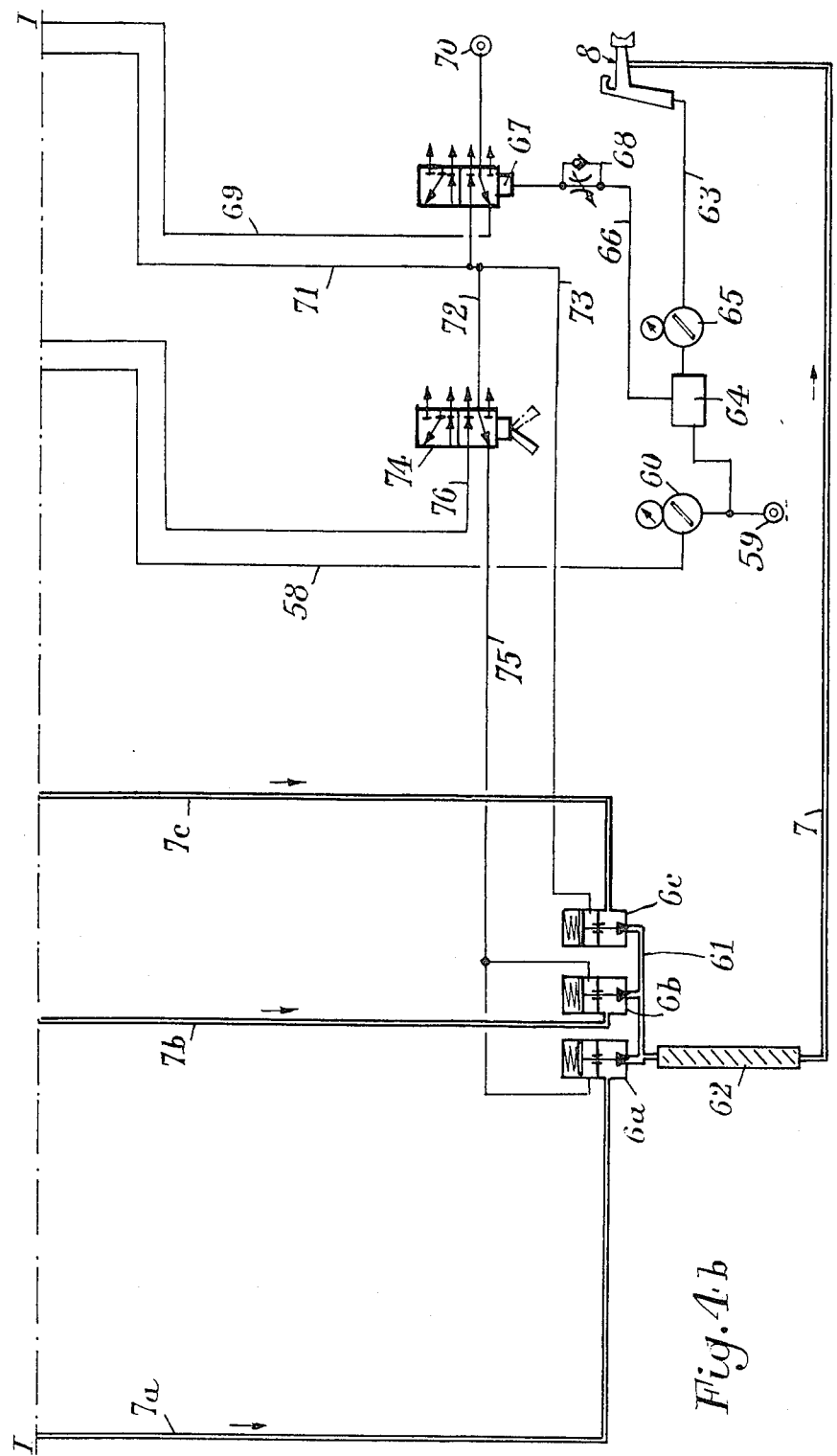
Fig. A.b

CONSTANT FLOW RATE FLUID SUPPLY DEVICE, PARTICULARLY FOR A SPRAY GUN

BACKGROUND OF THE INVENTION

1. Field of the Invention

The present invention relates to a device for supplying at a constant flow rate a fluid utilizing apparatus, for example a spray gun, with at least one fluid having a variable viscosity, for example paint, comprising a fluid source delivering said variable viscosity fluid and a fluid circuit connecting said fluid source to the fluid utilizing apparatus.

2. Description of the Prior Art

A paint spray gun is generally supplied with paint by a supply source delivering paint under pressure. The paint leaves the gun through a nozzle which may be sealed by a needle. The needle is for stopping or enabling the paint flow. Furthermore, a partial opening in the needle allows the flow to be adjusted by constricting to a greater or lesser extent the passage through the nozzle.

Such a conventional system is simple, but it does not allow a constant paint flow rate to be obtained. To obtain this constancy, it would be necessary first of all to accurately adjust the supply pressure for the paint, which could possibly be effected with a pressure reducer. But that would not be sufficient, for the flow rate of the paint through the orifice of the nozzle depends on the viscosity of the paint. Now, the viscosity of the paint is variable with the quality thereof, its dilution and especially its temperature. It will be readily understood that it is difficult to have the temperature absolutely under control.

According to the quality and the dilution of the paint, the pressure and the opening of the needle could be adjusted to the desired value, depending on the flow rate, but, for numerous uses, the paint is frequently changed during the working day to change the colour thereof for example. It would therefore be necessary, for each change, to adjust the pressure or the opening of the needle.

Furthermore, it is difficult to measure the paint flow rate, for the simple flow rate measuring systems give readings varying with the viscosity.

Finally, paints are abrasive and the wear of the orifices of the nozzles or of the ends of the needles causes variations in flow rate.

It is therefore of the most interest to supply a paint spray gun not with a constant pressure, but with a constant flow rate. It is certain, in this case, that the paint pressure may vary with all the elements mentioned above, but the constancy of the paint pressure is not required to ensure proper operation of the gun.

SUMMARY OF THE INVENTION

The object of the present invention is to provide a device for supplying a fluid utilizing apparatus, for example a spray gun, with at least one fluid having variable viscosity, for example paint, and which allows a constant and adjustable flow rate of the variable viscosity fluid to be obtained whatever its viscosity.

To this end, the supply device of the present invention is characterized in that it comprises furthermore two volumetric pumps mechanically coupled so that their flow rates are in a fixed relationship, a first one of the two pumps being inserted in the variable viscosity fluid circuit, whereas the second pump is inserted on a second fluid circuit, in which flows a constant viscosity fluid and which comprises, downstream of the second pump, means for adjusting the flow rate of the constant viscosity fluid.

The variable viscosity fluid may be for example paint, whereas the other fluid, with constant viscosity, may be for example water. If the flow rate of the water is well adjusted, the flow rate of the paint will also be well adjusted because the outputs of the two coupled volumetric pumps will always remain in a fixed relationship. In other words, the adjustment and the measurement of the flow rate are affected on an auxiliary fluid having stable characteristics independent of those of the paint. It will be assumed in the following description that the auxiliary fluid is water.

The pressure of the auxiliary constant viscosity fluid, water in this case, will not remain constant when the two pumps are operating. Consequently, to maintain the water flow rate at an adjusted and constant value and, consequently, to maintain also the paint flow rate at an adjusted and constant value, said means for adjusting the flow rate of the constant viscosity fluid may comprise, on the one hand, an adjustable pressure reducer connected to the output side of the second pump to adjust the pressure of the water and, on the other hand, a calibrated nozzle of adjustable diameter in series with the pressure reducer. The water flow rate and, consequently, that of the paint will be determined by the diameter of the calibrated nozzle. For a given value of the diameter of the calibrated nozzle, a flow rate adjustment may be obtained furthermore by adjusting the output pressure of the pressure reducer.

BRIEF DESCRIPTION OF THE DRAWINGS

A detailed description of different embodiments of the present invention will now be given with reference to the accompanying drawings in which:

FIGS. 4a and 4b, assembled along the line I—I, show a constant flow supply device according to the invention, for supplying a spray gun with a mixture of three products in constant, but adjustable, proportions and with a constant overall flow rate, but adjustable while maintaining the proportions of the three products.

DESCRIPTION OF THE PREFERRED EMBODIMENTS

Figure 1:
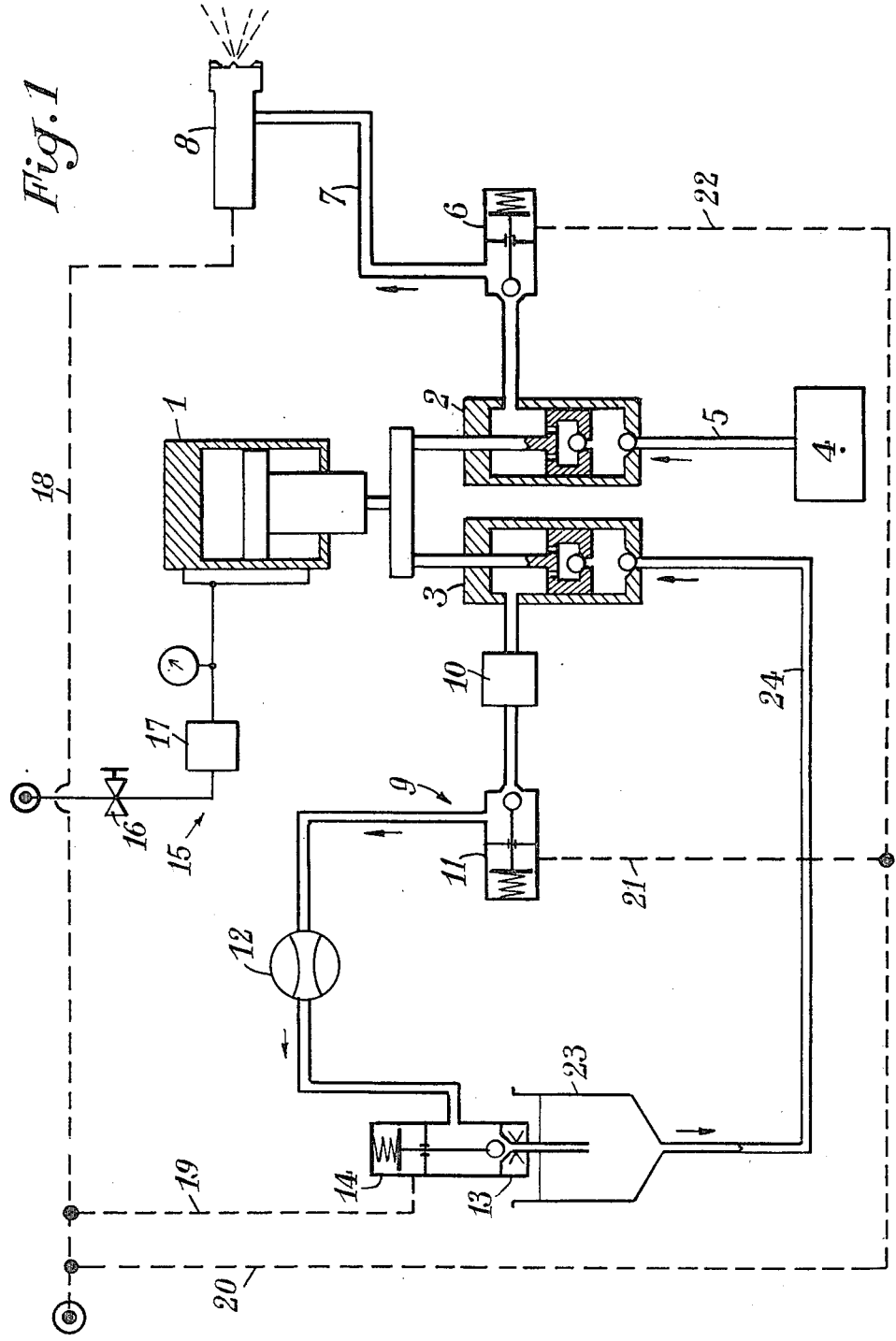
FIG. 1 shows schematically a first embodiment of a constant flow supply device according to the present invention, for supplying a spray gun with a single paint.

In FIG. 1, a reciprocating motor 1, for example a pneumatic motor, drives in synchronism the pistons of two coupled volumetric pumps 2 and 3. The pneumatic motor 1 and pumps 2 and 3 shown in FIG. 1 are of the differential type for simplifying the drawing and also the mounting, but it is to be noted that the motor 1 and/or pumps 2 and 3 may be double-acting, not differential ones.

A source of paint 4 delivers to pump 2, through a pipe 5, paint at a definite pressure, which may be the atmospheric pressure or a higher pressure.

The circuit fed by pump 2 is the paint circuit. Said circuit comprises, at the output of pump 2, a controlled valve 6. Since in conventional paint spraying installations a compressed air source is generally available, the controlled valve 6 is preferably formed by a pneumatically controlled valve. The output of the pneumatically controlled valve 6 is connected directly by a pipe 7 to the paint inlet of a conventional spray gun 8.

Circuit 9 fed by pump 3 is a water circuit. It comprises, in series, and adjustable pressure reducer 10, a controlled valve 11, preferably of the pneumatically controlled type, a flowmeter 12 and a calibrated nozzle 13 of adjustable diameter, incorporated in a controlled valve 14, preferably of the pneumatically controlled type.

Two compressed air circuits are provided. The first compressed air circuit 15 supplies pneumatic motor 1 with compressed air through a tap 16 and a pressure reducer 17. The second compressed air circuit controls, on the one hand, the operation of the spray gun 8 through a compressed air pipe 18 and, on the other hand, the operation of the pneumatically controlled valves 6, 11 and 14 through compressed air pipes 19, 20, 21 and 22. As can be seen in FIG. 1, the pneumatically controlled valves 6, 11 and 14 are preferably valves whose opening is controlled by pressure (normally closed valves), i.e. they open when compressed air is applied to them and close under the action of a spring when compressed air is no longer applied to them. However, the pneumatically controlled valves 6, 11 and 14 may also be of the pressure closing type (normally open valve). In this case, an appropriate distributor must be inserted in the control compressed air circuit for connecting valves 6, 11 and 14 to exhaust when compressed air is applied to gun 8, and for applying compressed air to said valves when compressed air is no longer applied to gun 8.

Downstream of the calibrated nozzle 13, the water circuit 9 is completed by a water tank 23 connected by a pipe 24 to the suction side of pump 3 so as to complete water circuit 9.

The constant flow paint supply device which has been described above operates in the following way.

When tap 16 is opened for supplying motor 1 with compressed air, the motor exerts a force on both piston rods of pumps 2 and 3. Said force will be equal to the sum of the forces opposed by both pistons, each of said forces being equal to the product of the pressure of the fluid (paint or water) by the effective section of the piston. If valves 6 and 11 are closed, the value of the pressures of the paint and of the water are undetermined. But if valves 6, 11 and 14 are opened and if the needle of gun 8 is opened at the same time, the gun will spray paint and the calibrated nozzle 13 will discharge water. The flow rate of the water will be well determined if the pressure of the water delivered by pump 3 is greater than the adjusted output pressure of reducer 10. The paint flow rate will also be determined and the pressure of the paint will be established at the value required for the paint flow to pass through the nozzle of gun 8. The pressure of the paint being thus established, the pressure of the water will be fixed at a value such that the sums of the resistant forces applied to the pistons of both pumps 2 and 3 is equal to that developed by motor 1. The force developed by motor 1 may be adjusted by adjusting the compressed air pressure supplying motor 1 by means of reducer 17 provided for this purpose.

The pneumatically controlled valves 6, 11 and 14 are provided so that during a pause, the pressures are maintained at the values reached during operation.

According to the value of the pressure of the paint delivered by source 4, it may be necessary to provide an adjustment means such that the pressure of the paint delivered by pump 2 is greater than the pressure of the paint delivered by source 4 to ensure correct operation of the valves of pump 2. Such an adjustment may for example be achieved by means of a calibrated nozzle of adjustable diameter incorporated in valve 6 in the same way as nozzle 13.

The device shown in FIG. 1 provides for the use of an automatic spray gun, for constant flow supply devices are provided especially for automatic equipment. Nevertheless, with a manual pneumatic or mixed (i.e. both pneumatically and hydrostatically operated spray gun, it is possible to control the opening of the pneumatically controlled valves 6, 11 and 14 by means of a known valve opening the control compressed air supply when we have an air flow through the spray gun.

The flowmeter 12 is for indicating the water flow rate, so the paint flow rate. This measurement allows the easy adjustment of a flow rate which, with older installations, was done by trial and error method. To adjust the flow rate, the diameter of the calibrated nozzle 13 may be adjusted or the water pressure by means of pressure reducer 10.

Figure 2:
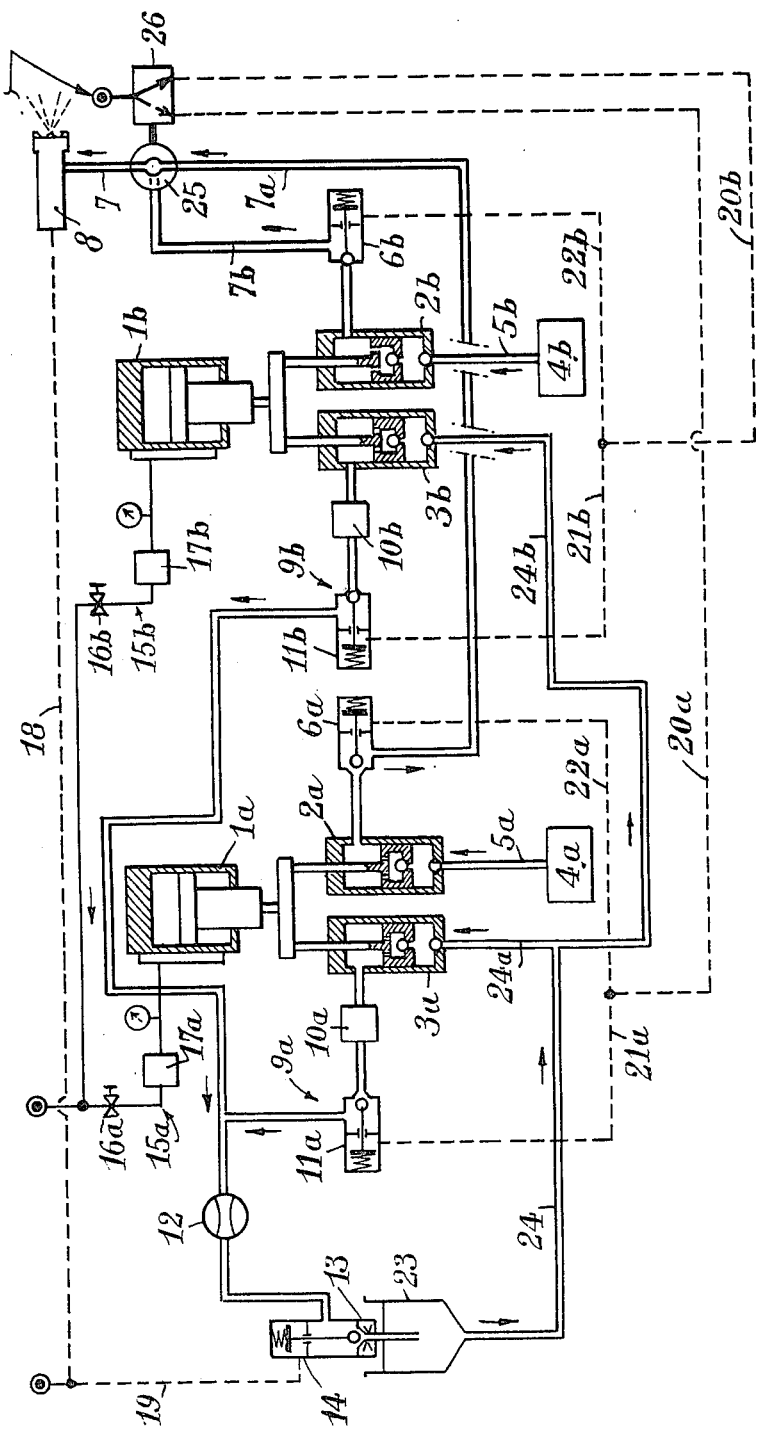
FIG. 2 shows schematically a supply device similar to the one shown in FIG. 1, but for supplying the spray gun alternately with two different paints.

In FIG. 2, there is shown a device for supplying a gun 8 with two different paints. In FIG. 2, the elements which are identical to those shown in FIG. 1 are designated by the same reference numbers, the letter a being added to the elements especially intended for the supply and the adjustment of the flow rate of the first paint, whereas the letter b is added to the elements especially intended for the supply and the adjustment of the flow rate of the second paint. The output sides of both pumps 2a and 2b are connected respectively by paint pipes 7a and 7b respectively to two inputs of a three-way valve 25, whose outlet is connected by pipe 7 to the paint inlet of gun 8 and which allows one or the other paint supplied by pumps 2a and 2b to be selected.

Actually, this three-way valve 25 is a simplified representation of known distributors, which fulfill automatically the function of selecting the paint and also, for each paint change, of different colours in general, rinsing with solvent the connection pipe 7 to gun 8 and the gun itself.

In the diagram of FIG. 2, there are provided two compressed air control circuits. The first control circuit 18, 19 controls the operation of gun 8 and the opening of the pneumatically controlled valve 14 of the water circuit. The second control circuit controls, through a distributor 26 mechanically coupled to the three-way valve 25, either the opening of pneumatically controlled valves 6a and 11a, or the opening of pneumatically controlled valves 6b and 11b, according to the paint selected by the three-way valve 25.

The water delivery side of each pump 3a, 3b is connected in parallel to a common portion of the return water circuit to tank 23, comprising the flowmeter 12 and the pneumatically controlled 14 containing the calibrated orifice 13. Similarly, tank 23 is connected by a common pipe 24 and by pipes 24a and 24b respectively to the water inlet sides of pumps 3a and 3b.

In the portion 9a or 9b of the water circuit peculiar to each pump 3a or 3b, we find the pressure reducer 10a or 10b and the pneumatically controlled valve 11a or 11b.

It is preferable to have a pressure reducer per pump 3a or 3b, for it is not sure that, in operation, the flow rate will be the same for both paints or that the fluidity characteristics of both paints are the same. In this case, there must be the possibility of adjusting the water pressure of both water circuits to adjust the water flow rates and consequently the paint flow rates to the desired values.

If the adjustment margins provided by pressure reducers 10a and 10b are insufficient, additional calibrated nozzles may be used (not shown) incorporated for example in pneumatically controlled valves 11a and 11b of each pump 3a and 3b. Thus, there will be, in each of the two water circuits, two calibrated nozzles in series, one specific to a pump 3a or 3b, the other (13) common to both water circuits.

As was mentioned above, it will be noted that such calibrated nozzles may also be incorporated in pneumatically controlled valves 6a and 6b in paint circuits 7a and 7b for ensuring possibly a paint delivery pressure greater than the pressure of the paint delivered by paint sources 4a and 4b.

In the paint supply devices shown in FIGS. 1 and 2, both pumps 2 and 3 or 2a and 3a or 2b and 3b are driven in synchronism by a reciprocating motor 1. Such supply devices will be for example used when the paint source 4, 4a or 4b delivers paint at a relatively low pressure, less than that which is required for operating gun 8.

Figure 3:
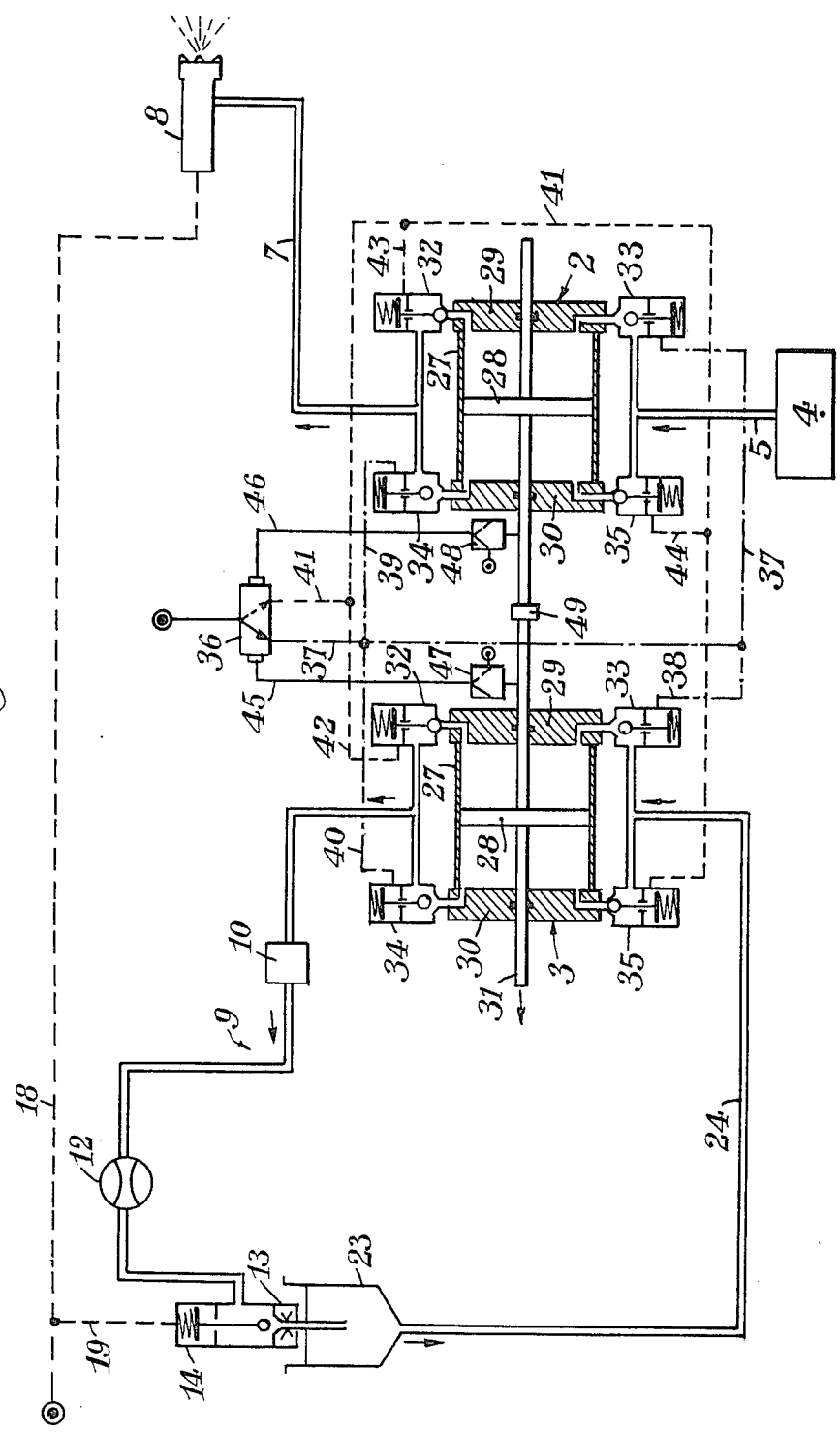
FIG. 3 shows schematically a second embodiment of the constant flow supply device of the invention.

However, in some conventional paint spraying installations, the paint is generally delivered by the source 4 at a pressure greater than that which is required for operating gun 8. In this case, we have a source of energy sufficient for operating both pumps 2 and 3 of the paint supply device of the invention, and the reciprocating motor 1 may be discarded. In fact, if paint source 4 delivers paint at high pressure, paint pump 2 may then operate as a motor to drive water pump 3. FIG. 3 shows schematically such a device. In FIG. 3, the elements which are identical to those shown in FIG. 1 or which have the same function are designated by the same reference numbers.

As shown in FIG. 3, pumps 2 and 3 are double-acting piston pumps. Each pump 2 and 3 comprises a cylinder 27 in which is movably disposed a piston 28. Each cylinder 27 is closed by two cylinder heads 29 and 30. Both pistons 28 are connected to one another by a shaft 31 which has a uniform section over the whole of its length and which passes through cylinder heads 29 and 30 of both pumps. Appropriate seals or packing provide the seal for the passage of shaft 31 through cylinder heads 29 and 30. Each cylinder head 29 comprises, at its upper part, a delivery orifice with which is associated a controlled valve 32, and, at its lower part, and admission orifice with which is associated a controlled valve 33. Similarly, each cylinder head 30 comprises, at its upper part, a delivery orifice with which is associated a controlled valve 34 and, at its lower part, an admission orifice with which is associated a controlled valve 35. The controlled valves 32, 33, 34 and 35 are preferably pneumatically controlled valves. As shown in FIG. 3, valves 32, 33, 34 and 35 are of the type whose opening is controlled by pressure (normally closed valves), but, of course, they could also be of the type whose closing is controlled by pressure (normally open valves). The control of valves 32, 33, 34 and 35 is arranged so that the admission orifice situated at one end of each cylinder 27 and the delivery orifices situated at the other end of each cylinder 27 are open when the discharge orifice situated at the first mentioned end and the admission orifice situated at the other end are closed, and vice-versa.

More precisely, the control of valves 32, 33, 34 and 35 comprises a compressed air distributor 36 comprising an inlet connected to a source of driving compressed air, two outlets and a slide valve member for selectively connecting one or the other of said outlets with the inlet of distributor 36. One of the outlets of distributor 36 is connected by pipes 37, 38, 39 and 40 to both valves 33 and to both valves 34, whereas the other outlet of distributor 36 is connected by pipes 41, 42, 43 and 44 to both valves 32 and to both valves 35.

The position of the slide valve member of distributor 36 is pneumatically controlled by two other compressed air inlets 45 and 46 which may be selectively connected to a compressed air source and to the atmosphere respectively by distributors 47 and 48 which are actuated by a cam 49 carried by shaft 31.

Paint source 4 is connected by pipe 5 to the inlets of both valves 33 and 35 associated with pump 2, and the outlets of both valves 32 and 34 associated with pump 2 are connected by pipe 7 to the paint inlet of gun 8. The outlets of both valves 32 and 34 associated with pump 3 are connected to the pressure reducer 10, and the water tank 23 is connected by pipe 24 to the inlets of both valves 33 and 35 associated with pump 3.

The supply device described above operates as follows. In the position shown in FIG. 3, distributor 36 feeds compressed air to both valves 33 and to both valves 34 which are consequently opened. Paint under pressure is then admitted into cylinder 27 of pump 2 on the right hand side of piston 28 of said pump which operates as a motor. Piston 28 of pump 2 moves from right to left shaft 31 and piston 28 of pump 3 which is operating as a pump. The paint previously admitted into cylinder 27 of pump 2 on the left hand side of piston 28 is then delivered through valve 34 and pipe 7 to gun 8. Similarly, water which is in cylinder 27 of pump 3 on the left hand side of piston 28 is delivered through the other valve 34 to pressure reducer 10, flowmeter 12, valve 14 and calibrated nozzle 13, while the water contained in tank 23 is admitted through pipe 24 and valve 33 to cylinder 27 of pump 3 on the right hand side of piston 28. When both pistons 28 arrive at the end of their stroke to the left, cam 49 switches momentarily distributor 47 to the source of compressed air so as to feed a pulse of compressed air to the inlet 45 of distributor 36. This results in changing the position of the slide valve member of distributor 36 which now applies compressed air to both valves 32 and to both valves 35 so as to open them. At the same time, since both valves 33 and both valves 34 are no longer supplied with compressed air, they close under the action of their return springs. Accordingly, the paint under pressure delivered by source 4 is now admitted through valve 35 on the left hand side of piston 28 into cylinder 27 of pump 2 operating as a motor. Both piston 28 and shaft 31 therefore now move from left to right. The paint previously admitted on the right hand side of piston 28 into cylinder 27 of pump 2 is now delivered through valve 32 and pipe 7 toward gun 8. Similarly, the water previously admitted on the right hand side of piston 28 into cylinder 27 of pump 3 is now delivered through the other valve 32 to the pressure reducer 10. When both pistons 28 arrive at the end of their stroke to the right, cam 49 momentarily switches distributors 48 to the compressed air source so as to feed a pulse of compressed air to the inlet 46 of distributor 36, which results in again changing the position of the slide valve member of the distributor 36 and bringing it to its starting position. Valves 33 and 34 are again opened and valves 32 and 35 are again closed and the operating cycle starts again as described above.

The adjustment of the water flow rate is effected in the same way as in the embodiments shown in FIGS. 1 and 2, by means of pressure reducer 10 and calibrated nozzle 13. If both pumps 2 and 3 have the same volume or volumes which are in a fixed relationship, the water flow rate and the paint flow rate are equal or in a fixed relationship. Accordingly, if the water flow rate is well adjusted, the paint flow rate on the exhaust side of pump 2 operating as a motor is itself adjusted to the same value as the water flow rate or to a value which is in a fixed relation with the value of the water flow rate.

When pump 2 operates as a motor as in the paint supply device shown in FIG. 3, it will be noted that it is necessary to use double-acting piston pumps and not differential pumps, for the latters do not give an even flow rate when they are operating as a motor.

It will also be noted that if the paint source 4 of the paint supply device shown in FIG. 3 delivers paint at a relatively low pressure, the two double-acting pumps 2 and 3 may both operate as pumps if shaft 31 is mechanically connected to a reciprocating motor, as for example the pneumatic motor 1 shown in FIG. 1.

Furthermore, it will also be noted that if each of the paint sources 4a and 4b of the paint supply device shown in FIG. 2 delivers paint at a sufficiently high pressure, the assembly comprising motor 1a and the two differential pumps 2a and 3a may be replaced by the assembly comprising the two double-acting pumps 2 or 3 shown in FIG. 3, as well as the assembly comprising motor 1b and differential pumps 2b and 3b of FIG. 2.

The embodiments which have been described above allow a spray gun to be supplied either with a single product (FIGS. 1 and 3), or selectively with two different products (FIG. 2).

However, there exist paints comprising two components reacting together to provide by copolymerization the desired film of paint. This reaction on each other of the two components prevents or makes difficult their previous mixing. The problem is then of having a supply device capable of ensuring continuous mixing of the two components, as needed, in a constant ratio and with a constant overall flow rate. Furthermore, the proportion of the two components of the mixture must be adjustable according to the type of paint used in accordance with the information supplied by the paint manufacturer. The overall flow rate must also be adjustable to ensure correct supply and proper operation of the spray gun. It is also sometimes necessary to dilute the paint with a diluent or solvent, the dilution ratio having to be constant in operation but adjustable according to the type of paint and the conditions of use. Finally, it is desirable to be able to use the solvent for rinsing at least a part of the supply circuits through which the paint flows.

The present invention also allows this problem to be resolved and there will now be described a supply device designed for this purpose, with reference to FIGS. 4a and 4b. In these figures, the elements which are identical or which have the same function as those which have been previously described, are designated by the same reference numbers.

The constant flow supply device shown in FIGS. 4a and 4b comprises three motor-pump assemblies A, B and C.

Assembly A comprises a reciprocating motor 1a, for example a pneumatic motor, which drives in synchronism the pistons of two coupled volumetric pumps 2a and 3a, for example differential pumps.

Preferably, the pneumatic motor 1a, pump 2a and pump 3a are disposed coaxially, the assembly of these three elements being maintained in position by means of tie-rods 50a. Piston rod 51a of pneumatic motor 1a is coupled directly to piston rod 52a of pump 3a and, through tie-rods 53a, to piston rod 54a of pump 2a. Such a coaxial disposition is particularly advantageous for all the stresses are exerted along the axis of the assembly and, accordingly, the assembly is well balanced whatever the resisting stresses absorbed by pump 2a or 3a.

Pump 2a draws from a tank 4a, through a pipe 5a, a first component, for example a dye, of the paint to be supplied to spray gun 8, and it delivers said first component to a controlled valve 6a through a pipe 7a.

Pump 3a draws a constant viscosity fluid, for example water, from a tank 23 through a main inlet line 24 common to the three assemblies A, B and C, and it delivers the water to a circuit 9a connected to tank 23 by a return line 9 common to the three assemblies A, B and C.

In water circuit 9a are disposed, in series in the flow direction of the water, a pressure reducer 10a controlled by compressed air, a controlled valve 11a, a adjusting nozzle 13a and a flow rate indicator 12a. So as to have a water pressure which does not vary too much at the input to the controlled pressure reducer 10a and to have consequently a constant water pressure at the output of the controlled pressure reducer 10a, a primary pressure reducer 55a is preferably inserted between the delivery side of pump 3a and the controlled pressure reducer 10a. The latter allows the water pressure to be adjusted to a constant value which depends on the value of the pressure of the controlling compressed air which is applied to the controlled pressure reducer 10a. In these circumstances, the water flow rate through nozzle 13a is constant and may be adjusted by varying the diameter of said nozzle. As the two pumps 2a and 3a are coupled and since, consequently, their flow rates are permanently equal or proportional accordingly as their cubic capacities are equal or different, the flow rate of the product delivered by pump 2a will be constant also and may be adjusted in the same proportions as the water flow rate of pump 3a by adjusting the latter either by means of the controlled pressure reducer 10a or by means of the adjustable nozzle 13a.

The two other motor-pump assemblies B and C and the fittings associated therewith have the same structure as the motor-pump assembly A and the fittings associated therewith and so will not be again described in detail. The elements of assemblies B and C and the fittings associated therewith which correspond to those of assembly A are designated by the same reference numbers to which the letter b or c is added accordingly as assembly B or C is concerned. It will simply be mentioned that pump 2b delivers a second component of the paint, for example a hardener or setting agent, whereas pump 2c delivers a third component, for example a diluent. Furthermore, at least a portion of the means for adjusting the flow rate of the water flowing in circuit 9c may be short-circuited to obtain, when so desired, a greater water flow rate and, consequently, a greater diluent flow rate, for example for rinsing a part of the circuits through which the paint passes. For this purpose, a by-pass 56 provided with a controlled valve 57 is connected in parallel to the circuit comprising the controlled valve 11c, the adjustable nozzle 13c and the water flow rate indicator 12c.

The three controlled-pressure reducers 10a, 10b and 10c are connected by a pipe 58 to a source 59 of controlling compressed air through an adjustable compressed air pressure reducer 60.

Controlled valves 6a, 6b, 6c, 11a, 11b, 11c and 57 are preferably pneumatically controlled valves. Valves 6a, 6b, 6c and 57 are for example normally closed valves, whereas valves 11a, 11b and 11c are for example normally open valves. Motors 1a, 1b and 1c and the above mentioned controlled valves may be supplied with compressed air by means of a control device which will be described later on.

The outlets of controlled valves 6a, 6b and 6c are connected to the main inlet line 61 of a mixer 62 which may be static or dynamic according to the need. The output of the mixer 62 is connected by pipe 7 to the paint inlet of the spray run 8. The latter is supplied with compressed air through pipe 63 in which there are mounted, from the compressed air source 59, a distributor 64 and an adjustable compressed air pressure reducer 65. The distributor 64 is arranged to supply pipe 66 with compressed air when the gun 8 is operating and to connect pipe 66 to exhaust when the gun is not operating. When pipe 66 is supplied with compressed air a distributor 67 is actuated through a delay means 68. The latter allows direct and immediate action when pipe 66 is under pressure, i.e. when gun 8 begins to operate. On the contrary, when gun 8 stops operating, the decompression of the control of distributor 67 is delayed. This allows the stopping of pneumatic motors 1a, 1b and 1c to be delayed and, accordingly, the removal of pressure from the paint circuit to be delayed when gun 8 is stopped for a short time between two paint applications.

At rest, when gun 8 is stopped and when pipe 66 is out of pressure distributor 67 is in the position shown in FIG. 4b. Under these conditions, pipe 69 is in communication with compressed air source 70 and normally open controlled valves 11a, 11b and 11c are supplied with compressed air, therefore closed. On the contrary, pipes 71, 72 and 73 are connected to exhaust, so that the pneumatic motors 1a, 1b and 1c do not operate and the normally closed controlled valve 6c remains closed. A distributor 74, in a first position (that shown in FIG. 4b), communicates pipe 72 with pipe 75 and pipe 76 with the exhaust and, in a second position, communicates pipe 72 with pipe 76 and pipe 75 with the exhaust. In the first position of distributor 74 and in the initial conditions mentioned above, the normally closed controlled valves 6a, 6b and 57 are therefore not supplied with compressed air and so remain closed. When the trigger of gun 8 is pressed and the latter begins to deliver compressed air, distributor 64 puts pipe 66 under pressure. Accordingly, distributor 67 switches, thus exhausting pipe 69 and communicating pipes 71, 72, 73 and 75 with the compressed air source 70. The result is that the normally open controlled valves 11a, 11b and 11c are exhausted and open, whereas compressed air is fed to pneumatic motors 1a, 1b and 1c which start to operate, and to the normally closed controlled valves 6a, 6b and 6c which open. The six pumps start up and deliver water and products to the corresponding circuits.

The respective flow rates of the three components of the paint which are delivered to circuits 7a, 7b and 7c respectively by pumps 2a, 2b and 2c may be adjusted independently of each other by adjusting the water flow rates in circuits 9a, 9b and 9c respectively by means of the adjustable nozzles 13a, 13b and 13c. Thus it is possible to adjust the proportions of dye and hardener fed to mixer 62 in accordance with the indications supplied by the manufacturer of the paint. Furthermore, it is also possible to adjust the dilution and, accordingly, the viscosity of the mixture fed to spray gun 8 by adjusting by means of the adjustable nozzle 13c the flow rate of diluent fed to mixer 62. Finally, it is also possible to adjust the overall flow of the mixture fed to gun 8 while maintaining the proportions of the three components of the mixture which have been respectively adjusted by means of the adjustable nozzles 13a, 13b and 13c, by adjusting the value of the water pressure simultaneously in the three water circuits 9a, 9b and 9c by means of the three controlled pressure reducers 10a, 10b and 10c. This may be obtained by adjusting by means of pressure reducer 60 the value of the pressure of the compressed air fed to the three controlled pressure reducers 10a, 10b and 10c.

When the work is finished, the parts of the circuit containing the mixture of the three components must be cleared and rinsed. The distributor 74 and the controlled valve 57 allow this operation to be achieved. In FIG. 4b, distributor 74 is shown in the operating position. In this case, the normally closed controlled valve 57 is exhausted, so closed, whereas the controlled valves 6a, 6b are communicated with pipe 72 so as to be controlled by distributor 67 for normal operation of the spray gun 8, i.e. for a painting cycle in accordance with the above description. For a rinsing cycle, the control lever of distributor 74 is placed in the position shown by dotted lines on FIG. 4b. In this case, the normally closed controlled valves 6a, 6b are exhausted, so closed, whereas pipe 76 is communicated with pipe 72 and the normally closed controlled valve 57 is supplied with compressed air through distributor 67 and the two pipes 72 and 76 when the trigger of gun 8 is pressed. In this case, the pneumatic motors 1a, 1b and 1c are supplied with compressed air, but only pump 2c may deliver solvent for only the controlled valve 6c is open, the other controlled valves 6a and 6b remaining closed. Furthermore, controlled valve 57 opens and the adjustable nozzle 13c and the flow rate indicator 12c are short-circuited by by-pass 56. This allows a large water flow rate to be obtained and, accordingly, a large solvent flow rate which rinses the line 61, mixer 62, pipe 7 and gun 8.

In the above, it has been assumed that the three controlled valves 11a, 11b and 11c were normally open valves. However, these three valves may also be normally closed valves. In this case, these three valves must be connected to pipe 71, pipe 69 being removed.

Although three motor-pump assemblies A, B and C are normally provided in the supply device shown in FIGS. 4a and 4b, one or more other additional motor-pump assemblies may be provided for other components, for example for other dyes, only the motor-pump assembly corresponding to the desired dye being used.

It is also possible to supply two or more spray guns. For that, there must be provided, for each of the three motor-pump assemblies A, B and C, as many fittings for regulating the water flow rate, i.e. as many controlled valves 11 and adjustable nozzles 13 as there are guns.

Furthermore, in the compressed air supply circuit for each gun, there must be provided a distributor similar to distributor 64 for controlling the operation of compressed air distributors similar to distributor 67. This system requires furthermore the balancing of the circuits supplying the guns with product, to balance out the distribution of the output of the pumps between the guns.

In the foregoing, it has been supposed that pumps 2a, 2b and 2c draw the two components of the paint and the solvent respectively from tanks 4a, 4b and 4c. However, if the two components of the paint and the solvent are delivered under pressure to the three pumps 2a, 2b and 2c, these three pumps may be used as motors for driving respectively the three water pumps 3a, 3b and 3c, and the pneumatic motors 1a, 1b and 1c may be dispensed with. In this case, controlled-valve pumps are used for the three pumps 2a, 2b and 2c in an arrangement similar to that shown in FIG. 3.

Finally, although the present invention has been described in its application to a paint spraying installation, it is obvious that it is also applicable in all cases where it is required to supply at a constant and adjusted flow rate a fluid utilizing apparatus with at least one fluid having variable viscosity.

It is moreover to be understood that the embodiments of the present invention which have been described above have been given by way of purely indicative examples which are in no wise limiting, and that numerous modifications may be made thereto without departing from the scope and spirit of the present invention as defined by the appended claims.

What is claimed is:

1. A device for supplying at a constant and adjustable flow rate a fluid utilizing apparatus with at least one fluid having variable viscosity, comprising a first fluid source delivering said variable viscosity fluid, a first fluid circuit connecting said first fluid source to the fluid utilizing apparatus, a second fluid circuit in which flows a constant viscosity fluid, two volumetric pumps mechanically coupled so that their flow rates are in a fixed relationship, a first one of the two pumps being inserted in the first fluid circuit, whereas the second pump is inserted in the second fluid circuit, and first adjusting means inserted in the second fluid circuit, downstream of the second pump, for adjusting the flow rate of the constant viscosity fluid, said first flow rate adjusting means comprising an adjustable pressure reducer connected to the output side of the second pump, and a first calibrated nozzle of adjustable diameter in series with the pressure reducer.

2. The device as claimed in claim 1, wherein a flowmeter is inserted in the second fluid circuit between the pressure reducer and the first calibrated nozzle, a first controlled valve is inserted in the first fluid circuit on the output side of the first pump, a second controlled valve is inserted in the second fluid circuit between the pressure reducer and the flowmeter, a third controlled valve is associated with the first calibrated nozzle, and a device is provided for controlling said first, second and third controlled valves.

3. The device as claimed in claim 2, wherein a second adjustable diameter calibrated nozzle is associated with the second controlled valve.

4. The device as claimed in claim 2, wherein a third adjustable diameter calibrated nozzle is associated with the first controlled valve.

5. The device as claimed in claim 1, wherein the two pumps are differential pumps actuated in synchronism by means of a single reciprocating motor.

6. The device as claimed in claim 5, wherein the reciprocating motor is a pneumatic motor.

7. The device as claimed in claim 1, further comprising a three-way valve having a first input connected to the first fluid circuit, a second input and an output connected to the fluid utilizing apparatus, a second fluid source delivering another variable viscosity fluid, a third fluid circuit connecting said second fluid source to the second input of the three-way valve, a fourth fluid circuit in which flows a constant viscosity fluid, third and fourth volumetric pumps mechanically coupled so that their flow rates are in a fixed relationship, the third pump being inserted in the third fluid circuit, whereas the fourth pump is inserted in the fourth fluid circuit, and second flow rate adjusting means inserted in said fourth fluid circuit, downstream of the fourth pump, for adjusting the flow rate of the constant viscosity fluid.

8. The device as claimed in claim 7, wherein the second and fourth fluid circuits have a common portion, and the first flow rate adjusting means associated with the second fluid circuit and the second flow rate adjusting means associated with the fourth fluid circuit have a common portion disposed in the common portion of the second and fourth fluid circuits.

9. The device as claimed in claim 1, wherein the two pumps are double-acting pumps.

10. The device as claimed in claim 9, wherein one of the two fluids is delivered at high pressure to one of the two double-acting pumps, and at least that one of the two double-acting pumps which receives the high pressure fluid has controlled valves and is used as a motor for driving the other double-acting pump.

11. The supply device as claimed in claim 1, further comprising a mixer having an output connected to the fluid utilizing apparatus, a first input connected to the first fluid circuit and a second input for a second variable viscosity fluid, a second fluid source delivering the second variable viscosity fluid, a third fluid circuit connecting the second fluid source to the second input of the mixer, a fourth fluid circuit in which flows a constant viscosity fluid, third and fourth volumetric pumps which are mechanically coupled so that their flow rates are in a fixed relationship and which are inserted respectively in the third and fourth fluid circuits, second flow rate adjusting means disposed in the fourth fluid circuit downstream of the fourth pump, and first and second flow rate indicators disposed respectively in the second and fourth fluid circuits.

12. The device as claimed in claim 11, further comprising a third fluid source delivering a diluent, a fifth fluid circuit connecting the third source to a third input of the mixer, a sixth fluid circuit in which flows a constant viscosity fluid, fifth and sixth volumetric pumps which are mechanically coupled so that their flow rates are in a fixed relationship and which are inserted respectively in the fifth and sixth fluid circuits, third flow rate adjusting means disposed in the sixth fluid circuit downstream of the sixth pump, and a third flow rate indicator disposed in the sixth fluid circuit.

13. The supply device as claimed in claim 12, wherein each of said first, second and third flow rate adjusting means comprises a compressed air controlled pressure reducer and an adjusting nozzle disposed downstream of the controlled pressure reducer.

14. The supply device as claimed in claim 13, wherein the controlled pressure reducers are connected to a source of controlling compressed air through a single adjustable compressed air pressure reducer.

15. The supply device as claimed in claim 13, wherein a primary pressure reducer is inserted in each of said second, fourth and sixth fluid circuits between the output side of the corresponding pump and the controlled pressure reducer.

16. The supply device as claimed in claim 12, wherein said second, fourth and sixth fluid circuits have a common portion comprising a constant viscosity fluid tank, a main inlet line connecting said tank to the second, fourth and sixth pumps, and a return line to the tank.

17. The device as claimed in claim 12, further comprising first, third and fifth controlled valves inserted respectively in the first, third and fifth fluid circuits between the output side of the first, third and fifth pumps and the first, second and third inputs of the mixer, second, fourth and sixth controlled valves inserted respectively in the second, fourth and sixth fluid circuits on the output side of the second, fourth and sixth pumps, and a control device connected to said controlled valves for causing their opening in response to the actuation of the fluid utilizing apparatus.

18. The device as claimed in claim 17, further comprising a by-pass connected in parallel to at least one portion of the third flow rate adjusting means, a seventh controlled valve inserted in the by-pass, and a two-position switching device mounted between the control device and the first, third and seventh controlled valves for causing, in a first position, the opening of the first and third valves and the closing of the seventh valve and, in a second position, the opening of the seventh valve and the closing of the first and third valve.

19. The device as claimed in claim 18, wherein said controlled valves are pneumatically controlled valves, and each pair of mechanically coupled pumps is driven by a reciprocating pneumatic motor.

20. The device as claimed in claim 1, wherein said fluid utilizing apparatus is a spray gun and said variable viscosity fluid is paint.

21. The device as claimed in claim 20, wherein said constant viscosity fluid is water.

* * * * *